J. E. KERSHAW.
VEHICLE.
APPLICATION FILED DEC. 10, 1910.
1,015,804.
Patented Jan. 30, 1912.
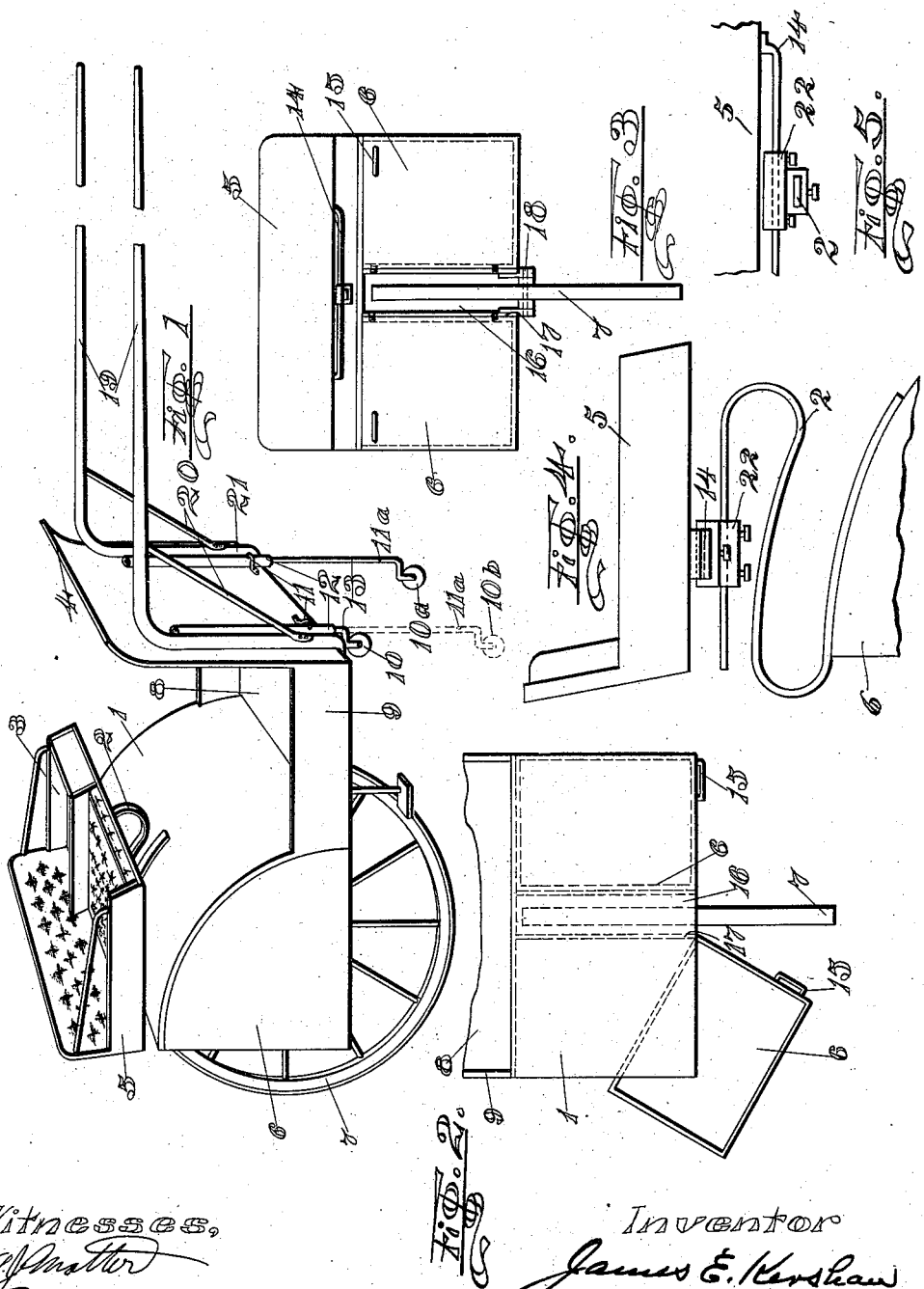

UNITED STATES PATENT OFFICE.

JAMES E. KERSHAW, OF HILLSBORO, OREGON.

VEHICLE.

1,015,804.     Specification of Letters Patent.     Patented Jan. 30, 1912.

Application filed December 10, 1910. Serial No. 596,727.

*To all whom it may concern:*

Be it known that I, JAMES E. KERSHAW, a citizen of the United States, residing at Hillsboro, in the county of Washington and State of Oregon, have invented certain new and useful Improvements in Vehicles, of which the following is a specification.

This invention relates to improvements in single wheeled vehicles and has for its object to provide a vehicle of this character which can be maintained in an upright position when not in use, which can be more easily supported upright, when in use, than similar vehicles hitherto made.

A further object is to provide the box of the vehicle with compartments for the convenience of the user, besides other novel features of construction and arrangement of parts, which will be referred to in detail.

I accomplish these objects by the mechanism illustrated in the accompanying drawings, in which—

Figure 1 is a perspective view of the vehicle as built for use. Fig. 2 is a plan of the rear portion showing a compartment open. Fig. 3 is a rear elevation. Fig. 4 is a side view of the seat support. Fig. 5 is a rear view of same.

Similar characters indicate similar parts throughout the several views.

In the drawing 1 represents the body of my improved vehicle, made to conform to the circumference of the wheel 7, upon which it is mounted, being secured upon the frame 16, which is properly journaled to bear on the axle 18, as indicated at 17. This body is provided in the front with the foot space 8, the sides 9 and the dash-board 4.

To the front of the vehicle body is secured the shafts 19 provided with the braces 20, secured in a substantial manner as at 21. Upon each of the front corners of the body is placed a tube 12, fastened in any convenient manner and having an aperture at its lower end, into which the key 11 is adapted to fit. In each of these tubes is fitted a smaller tube or bar 13, provided with apertures 11$^a$ to receive the key 11. One of which apertures being placed near the top of the bar so that when it is secured in the tube at that point the lower end will rest on the ground when the body is in a horizontal position. These supports at each corner will thus maintain the vehicle upright when not in use. At the lower end of each bar is placed wheels 10 and 10$^a$ to facilitate movement by hand. In order to present a neat appearance, the bar is bent at right angles so as to bring the wheel beneath the box, when the bar is telescoped into the tube, as indicated at 10, where it is retained by placing the key into the lower aperture 11$^a$. When that bar is extended the wheel will assume the position shown dotted at 10$^b$. To the frame 16 is pivotally secured the compartments 6, made to conform to the shape of the body, and provided with the hand-hold 15, whereby they may be swung open or shut at will. These compartments may be made of any convenient size and several may be mounted one above the other.

Upon the body is secured spring 2, to which is fitted the support 22 which is adapted to be moved longitudinally along the spring bar 2 and secured at any desired point, thus adjusting the weight of the driver to the proper position on the wheel. This support is adapted also to receive the transverse bar 14, upon which the seat 5 is secured, which permits of a lateral adjustment, to balance the load carried by the vehicle. In the seat is formed the driver's box 3.

A vehicle formed in this manner can be drawn over any road that a single horse can travel and a much heavier load can be drawn than is possible to carry on horse back. It is especially adapted to use as a delivery wagon and for use in rural mail delivery.

Having thus described my invention, what I claim as new and desire to secure by Letters Patent, is—

1. The combination in a vehicle of a wheel provided with an axle,—a frame journaled to bear thereon,—a vehicle body laterally balanced on said frame,—a compartment pivotally suspended at its rear corner to the frame adjacent each side of the wheel and adapted to swing beneath said body,—and a seat mounted on said body, adapted to be adjusted both laterally and longitudinally, as a counterpoise for the vehicle.

2. The combination in a vehicle of a wheel provided with an axle,—a frame journaled to bear thereon,—a vehicle body laterally balanced on said frame,—a compartment pivotally suspended at its rear corner to the frame adjacent each side of the wheel, and adapted to swing beneath said body,—a spring support secured upon said body,—a seat provided at its under side with a transverse bar,—and means for adjustably securing the seat to said support, whereby it may be adjusted both on the support and on the bar.

In testimony whereof I affix my signature in presence of two witnesses.

JAMES E. KERSHAW.

Witnesses:
Wm. H. Meyer,
W. D. Ordway.

Copies of this patent may be obtained for five cents each, by addressing the "Commissioner of Patents, Washington, D. C."